(12) United States Patent
Fujii et al.

(10) Patent No.: US 10,490,212 B2
(45) Date of Patent: Nov. 26, 2019

(54) ROW BAR AND WAFER FOR FORMING MAGNETIC HEADS

(71) Applicant: SAE Magnetics (H.K.) Ltd., Hong Kong (CN)

(72) Inventors: Ryuji Fujii, Hong Kong (CN); Shi Xiong Chen, GuangDong (CN); Long Ping Wang, GuangDong (CN); Zeng Hui Zhang, GuangDong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 274 days.

(21) Appl. No.: 15/653,788

(22) Filed: Jul. 19, 2017

(65) Prior Publication Data

US 2018/0025744 A1 Jan. 25, 2018

(30) Foreign Application Priority Data

Jul. 19, 2016 (CN) .................... 2016 2 0766708 U

(51) Int. Cl.
*G11B 5/31* (2006.01)
*G11B 5/10* (2006.01)
*G11B 5/127* (2006.01)

(52) U.S. Cl.
CPC ............. *G11B 5/3103* (2013.01); *G11B 5/10* (2013.01); *G11B 5/1272* (2013.01); *G11B 5/3163* (2013.01); *G11B 5/3173* (2013.01)

(58) Field of Classification Search
CPC ........ B23Q 15/00; B23Q 17/00; G11B 5/127; G11B 5/10; G11B 5/1272; G11B 5/3103; G11B 5/3163; G11B 5/3173
See application file for complete search history.

(56) References Cited

U.S. PATENT DOCUMENTS

| | | | | |
|---|---|---|---|---|
| 5,023,991 A * | 6/1991 | Smith | ..................... | B23Q 17/20 29/603.09 |
| 5,175,938 A * | 1/1993 | Smith | ..................... | B23Q 17/20 29/407.01 |
| 5,494,473 A * | 2/1996 | Dupuis | ................. | B24B 37/048 29/603.09 |
| 6,047,224 A * | 4/2000 | Stover | ..................... | B24B 49/10 700/119 |
| 6,193,584 B1 * | 2/2001 | Rudy | ..................... | B24B 37/013 29/593 |
| 6,325,699 B1 * | 12/2001 | Sudo | ..................... | B24B 37/005 451/10 |

(Continued)

*Primary Examiner* — Carl J Arbes
(74) *Attorney, Agent, or Firm* — Nixon & Vanderhye PC

(57) ABSTRACT

A row bar for forming magnetic heads includes a row of magnetic head forming portions each having a magnetic head and a cutting portion adjacent to the magnetic heads. A row of bonding pads and a first ELG pad are provided at the magnetic head, a second ELG pad is provided at the cutting portion, both of the first and the second ELG pads are adapted for contacting with a probe during lapping process, and a conductive structure that is higher than surfaces of the first and the second ELG pads is formed at peripheries of the first and the second ELG pads respectively. Due to the conductive structures, a probe used in lapping process will be prevented from shifting from the ELG pads to ensure a stable contact, thereby obtaining efficient and accurate resistance measurement.

14 Claims, 3 Drawing Sheets

(56) References Cited

U.S. PATENT DOCUMENTS

| | | | |
|---|---|---|---|
| 6,347,983 B1* | 2/2002 | Hao | B24B 37/04 |
| | | | 29/603.09 |
| 6,370,763 B1* | 4/2002 | Watanuki | B24B 37/013 |
| | | | 29/603.09 |
| 6,857,937 B2* | 2/2005 | Bajorek | G11B 5/10 |
| | | | 29/603.08 |
| 7,116,519 B2* | 10/2006 | Koeppe | G11B 5/127 |
| | | | 360/129 |
| 8,351,162 B2* | 1/2013 | Etoh | G11B 5/1278 |
| | | | 360/121 |
| 8,956,201 B2* | 2/2015 | Druist | B24B 37/005 |
| | | | 451/1 |

* cited by examiner

ROW BAR AND WAFER FOR FORMING MAGNETIC HEADS

This application claims priority to CN patent Application No. 201620766708.2 filed July 19, 2016, the entire contents of which are hereby incorporated by reference.

FIELD OF THE INVENTION

The present invention relates to the field disk drive units of information recording, more particularly, to a row bar and a wafer for forming magnetic heads.

BACKGROUND OF THE INVENTION

Vertical magnetic recording is a promising recording technology for recording magnetic data on a disk whose magnetic moment is perpendicular to the plane of the disk. The development from longitudinal magnetic recording to vertical magnetic recording will advance the increasing density of data on the disks in the future.

The magnetic head using the vertical recording method includes a thin film coil for generating magnetic flux and a magnetic pole layer extending from the rear portion of the air bearing surface and emitting the magnetic flux generated by the film coil to the recording medium. The magnetic pole layer includes, for example, a track width defining portion including a width (uniform width) defining a recording track width of the recording medium. The height of the track width defining portion of the magnetic pole layer is the height of the neck served as an important factor for measuring the recording performance of the magnetic head, which is defined from the front end of the track width defining portion to its trailing end. In the vertical recording method of the magnetic head, when the current flows through the thin film coil and the magnetic flux for recording is generated, the magnetic flux is emitted from the tip of the track width defining portion in the pole layer, thereby generating a recorded magnetic field (vertical magnetic field) for magnetizing the recording medium. Thus, the information is magnetically recorded on the recording medium. Recently, new magnetic heads have a function of not only recording information to a recording medium, but also a function of reading information from a recording medium.

Magnetic heads are typically constructed on a wafer that is sliced into separate row bars. One surface of the row bar will be lapped to obtain predetermined size for the read head portion and the write head portion, specifically, the MR height of the read head portion and the neck height of the write head portion are desirable, to form an air bearing surface. After that, the row bar will be cut into individual magnetic heads.

For ensuring the running performance of the film magnetic heads, it's necessary to maintain the high accuracy of the MR height for reading and the neck height for writing during the lapping process. The lapping process is commonly controlled by means of electrical lapping guides (ELG) formed on different positions of the row bar. Conventionally, the ELG is configured between two adjacent magnetic heads, while the current ELG may be directly configured on the magnetic head. In some samples, one magnetic head may be provided with one or more ELGs. While two ELG pads are formed on the surface of the magnetic head to connect with the ELGs, thus a resistance measure can be performed by means of the ELG pads. Resistance of the ELG will be varied as the lapped quantity, which may be used for monitoring the lapping process during the manufacturing of the magnetic head therefore. Once the resistance of the ELG is achieved to a threshold value, the lapping process is finished.

Commonly, a measurement device for measuring the resistance of ELG includes a probe board, multiple pins of the probe are in contact with the ELG pads on the row bar, and the pins are connected with the a measurement board to form a current loop on each magnetic head of the row bar, thereby measuring the resistance for each magnetic head. However, due to these ELG pads have planar surface, thus the probe contacting with the planar and smooth surface will be easily shifted and removed across the surface during the lapping process, which leads to an inaccurate measurement or even a failed measurement.

Hence, it is desired to provide an improved row bar and a wafer for forming magnetic heads to overcome the above-mentioned drawbacks.

SUMMARY OF THE INVENTION

One aspect of the present invention is to provide a row bar for forming magnetic heads, which has conductive structures around the ELG pads, thus a probe used in lapping process will be prevented from shifting from the ELG pads to ensure a stable contact between the probe and the ELG pads, thereby obtaining efficient and accurate resistance measurement.

Another aspect of the present invention is to provide a wafer for forming magnetic heads, which has conductive structures around the ELG pads, thus a probe used in lapping process will be prevented from shifting from the ELG pads to ensure a stable contact between the probe and the ELG pads, thereby obtaining efficient and accurate resistance measurement.

To achieve above objectives, a row bar for forming magnetic heads includes a row of magnetic head forming portions each of which has a magnetic head to be cut from the row bar and a cutting portion adjacent to the magnetic heads. A row of bonding pads and a first electrical lapping guide pad are provided at the magnetic head, a second electrical lapping guide pad is provided at the cutting portion, both of the first and the second electrical lapping guide pads are adapted for contacting with a probe during lapping process, wherein a conductive structure that is higher than surfaces of the first and the second electrical lapping guide pads is formed at peripheries of the first and the second electrical lapping guide pads respectively.

Preferably, the conductive structures are formed around the peripheries of the first and the second electrical lapping guide pads respectively.

Preferably, the conductive structures are arranged at two opposite sides of the first and the second electrical lapping guide pads.

Preferably, the conductive structures are shaped in a strip, and have a width in a range of 8 μm~15 μm.

Preferably, the conductive structures have a thickness at a distance from the surface of the first and the second electrical lapping guide pads, with a range of 500 A~1000 A.

Preferably, the conductive structures are made of titanium or tantalum.

Accordingly, a wafer for forming magnetic heads includes multiple row bars each of which comprises a row of magnetic head forming portions, each magnetic head forming portion has a magnetic head to be cut from the row bar and a cutting portion adjacent to the magnetic head. A row of bonding pads and a first electrical lapping guide pad are provided at the magnetic head, a second electrical lapping guide pad is provided at the cutting portion, both of the first and the second electrical lapping guide pads are adapted for contacting with a probe during lapping process, wherein a conductive structure that is higher than surfaces of the first and the second electrical lapping guide pads is formed at peripheries of the first and the second electrical lapping guide pads respectively.

Preferably, the conductive structures are formed around the peripheries of the first and the second electrical lapping guide pads respectively.

Preferably, the conductive structures are arranged at two opposite sides of the first and the second electrical lapping guide pads.

Preferably, the conductive structures are shaped in a strip, and have a width in a range of 8 μm~15 μm.

Preferably, the conductive structures have a thickness at a distance from the surface of the first and the second electrical lapping guide pads, with a range of 500 A~1000 A.

Preferably, the conductive structures are made of titanium or tantalum.

In comparison with the prior art, since the conductive structures are formed around the first and the second ELG pads and are higher than the surfaces of the first and the second ELG pads, thus the probe during the lapping process will be limited by the conductive structures and will not easily shift across the contacting surface of the ELG pads, thereby ensuring a good contact between the probe and the ELG pads to perform efficient and accurate resistance measurement.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
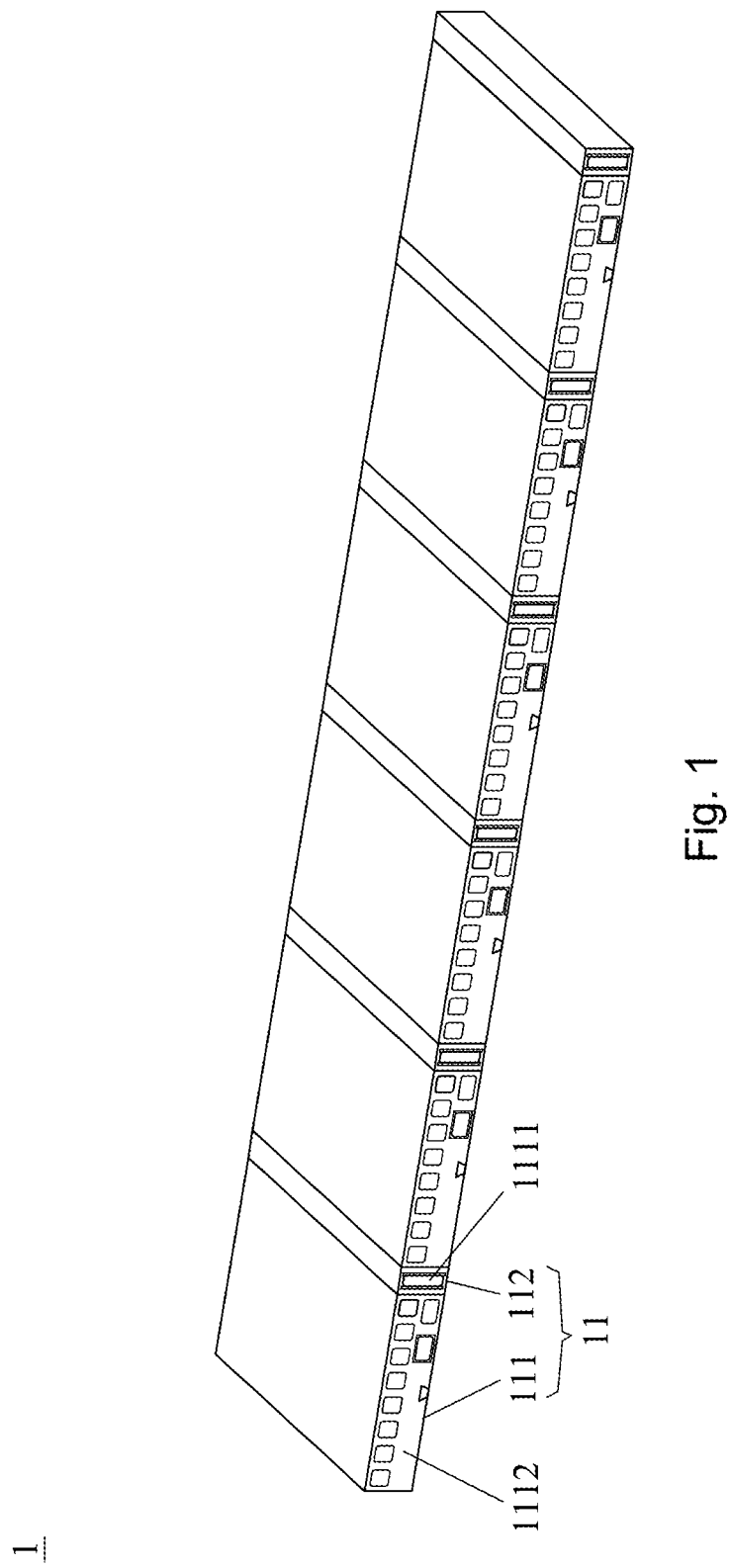
FIG. 1 is a schematic view of a row bar according to one embodiment of the present invention.

Various preferred embodiments of the invention will now be described with reference to the figures, wherein like reference numerals designate similar parts throughout the various views. As indicated above, the invention is directed to a row bar for forming magnetic heads.

FIG. 1 is a schematic view of a row bar 1 according to one embodiment of the present invention. As well known, row bars cut from a wafer are used for forming magnetic heads. The row bar 1 includes a row of magnetic head forming portions 11, each of which has multiple magnetic heads 111 cut from the row bar 1 and cutting portions 112 adjacent to the magnetic heads 11. Each cutting portion 112 includes a second electrical lapping guide (ELG) pad is arranged between one magnetic head 111 and the adjacent magnetic head 111, and every second ELG pad 1111 is electrically connected with an electrical lapping guide (ELG) member (not shown) configured on the corresponding magnetic head 111, for ELG resistance measurement of magnetic heads during the lapping process.

Figure 2:
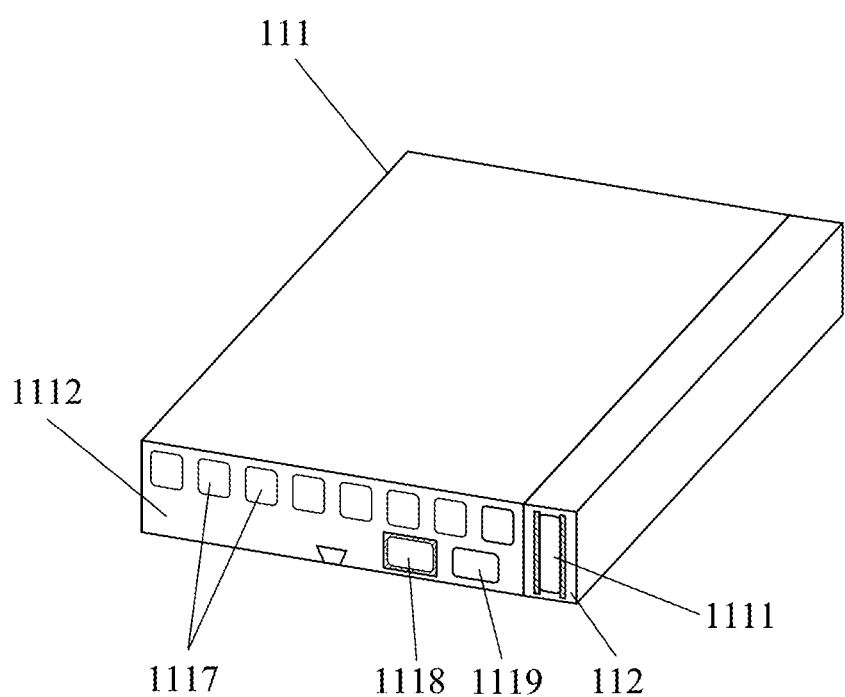
FIG. 2 is a partial view of the row bar as shown in FIG. 1.
Figure 3:
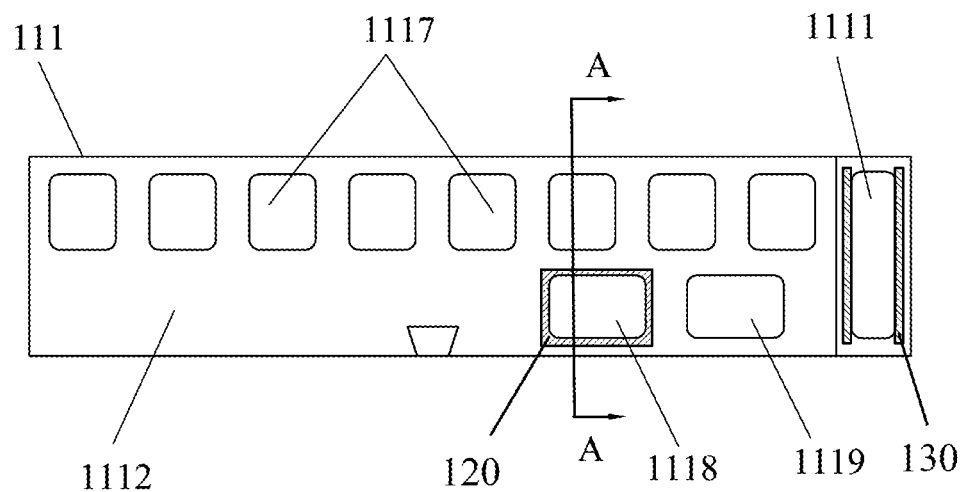
FIG. 3 is a side view of FIG. 2.

Referring to FIGS. 2-3, a plurality of bonding pads 1117 are formed in a row on the trailing edge 1112, which are electrically connected with the magnetic write head and the magnetic read head. A first ELG pad 1118 is also arranged on the trailing edge 1112 but in a different row from the bonding pads 1117. The second ELG pad 1111 is arranged on the cutting portion 112, which is electrically connected with the first ELG pad 1118. Specifically, the ELG pads 1111 and 1118 are connected to two ELGs of the magnetic head respectively. Furthermore, a grounding pad 1119 is arranged on the trailing edge 1112 and electrically connected with the ELG pads 1111 and 11118.

Figure 4:
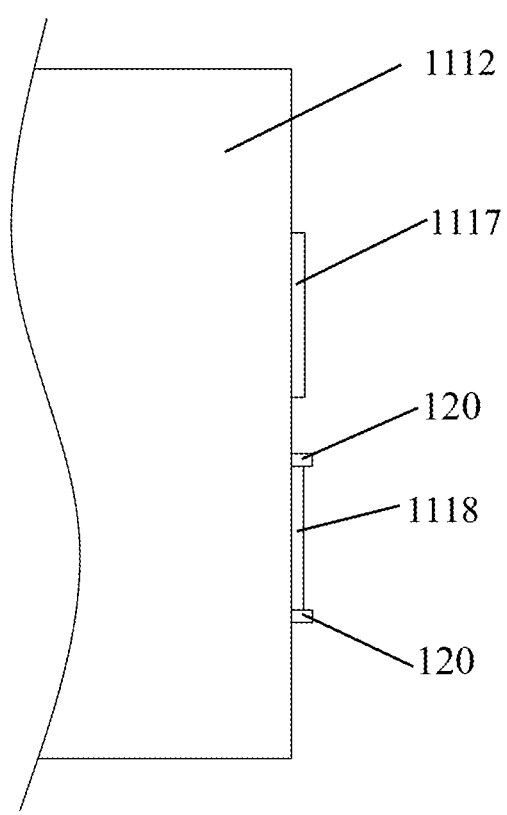
FIG. 4 is a schematic view of FIG. 3 along A-A line.

As an improvement of the present invention, as shown in FIGS. 3-4, a first conductive structure 120 is formed at the periphery of the first ELG pad 1118, specifically around the first ELG pad 1118. The height (namely the thickness) of the first conductive structure 120 is higher than a plane of the first ELG pad 1118 therefore serving as a limiting portion which is beneficial to prevent a probe from shifting from the first ELG pad 1118 during ELG resistance measurement in the lapping process to cause a contact failure. Preferably, the first conductive structure 120 is shaped in a strip and made of conductive metals such as titanium (Ti) or tantalum (Ta), and the first conductive structure 120 has a width in a range of 8 μm~15 μm and a thickness (that is the height at a distance from the surface of the first ELG pad 1118) in a range of 500 A~1000 A. More preferably, the outer contour of the first conductive structure 120 is corresponding to the first ELG pad 1118, such as rectangular. Specifically, a second conductive structure 130 is formed at the periphery of the second ELG pad 1111, which includes two rectangular strips, for example. Preferably, two rectangular strips of the second conductive structure 130 are formed at two long sides of the second ELG pad 1111, which are higher than the surface of the second ELG pad 1111 to form a limiting portion. The function of the second conductive structure 130 is the same with the first conductive structure 120, and the ranges of the width and thickness are the same as well. Of course, the second conductive structure 130 may be formed around the second ELG pad 1111, similarly to the first conductive structure 130, which also can prevent the probe from shifting from the surface of the ELG pad. By this token, the shape and size of the ELG pads 1118, 1111 are not limited in the present invention and may be chosen according to actual demands.

As another aspect, the present invention further provides a wafer (not shown) formed with multiple row bars 1 mentioned above, and each row bar 1 has the same structure as explained above, which is not repeated here.

A lapping process for magnetic heads may be performed in a row bar level or a wafer level. During the lapping, probes of a probe board will be in contact with the first and the second ELG pads 1118 and 1111 to form current loop on the magnetic heads, thereby performing ELG resistance measurement. Since the conductive structures 120 and 130 are formed around the first and the second ELG pads 1118 and 1111 and are higher than the surfaces of the first and the second ELG pads 1118 and 1111, thus the probe limited by the conductive structure may not easily shift from or across the contacting surface, thereby ensuring a good contact between the probe and the pad to perform efficient and accurate resistance measurement.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A row bar for forming magnetic heads, comprising:
    a row of magnetic head forming portions each of which has a magnetic head to be cut from the row bar and a cutting portion adjacent to the magnetic head,
    a row of bonding pads and a first electrical lapping guide pad being provided at the magnetic head,
    a second electrical lapping guide pad being provided at the cutting portion, both of the first and the second electrical lapping guide pads being adapted for contacting with a probe during a lapping process, and
    a first conductive structure and a second conductive structure formed at peripheries of the first and the second electrical lapping guide pads respectively, wherein the first conductive structure and second conductive structure protrude above surfaces of the first and the second electrical lapping guide pads respectively.

2. The row bar for forming magnetic heads according to claim 1, wherein the first and second conductive structures are formed around the peripheries of the first and the second electrical lapping guide pads respectively.

3. The row bar for forming magnetic heads according to claim 1, wherein the first and second conductive structures are arranged at two opposite sides of the first and the second electrical lapping guide pads.

4. The row bar for forming magnetic heads according to claim 1, wherein the first and second conductive structures are shaped in a strip, and have a width in a range of 8 µm~15 µm.

5. The row bar for forming magnetic heads according to claim 1, wherein the first and second conductive structures extend beyond the surface of the first and the second electrical lapping guide pads by about 500 A~1000 A.

6. The row bar for forming magnetic heads according to claim 1, wherein the first and second conductive structures are made of titanium or tantalum.

7. A wafer for forming magnetic heads, comprising:
    multiple row bars each of which comprises a row of magnetic head forming portions, each magnetic head forming portion having a magnetic head to be cut from the row bar and a cutting portion adjacent to the magnetic head,
    a row of bonding pads and a first electrical lapping guide pad being provided at the magnetic head,
    a second electrical lapping guide pad being provided at the cutting portion, both of the first and the second electrical lapping guide pads being adapted for contacting with a probe during a lapping process, and
    a first conductive structure and second conductive structure formed at peripheries of the first and the second electrical lapping guide pads respectively, wherein the first conductive structure and second conductive structure protrude above surfaces of the first and the second electrical lapping guide pads respectively.

8. The wafer for forming magnetic heads according to claim 7, wherein the first and second conductive structures are formed around the peripheries of the first and the second electrical lapping guide pads respectively.

9. The wafer for forming magnetic heads according to claim 7, wherein the first and second conductive structures are arranged at two opposite sides of the first and the second electrical lapping guide pads.

10. The wafer for forming magnetic heads according to claim 7, wherein the first and second conductive structures are shaped in a strip, and have a width in a range of 8 µm~15 µm.

11. The wafer for forming magnetic heads according to claim 7, wherein the first and second conductive structures protrude above the surfaces of the first and the second electrical lapping guide pads by about 500 A~1000 A.

12. The wafer for forming magnetic heads according to claim 7, wherein the first and second conductive structures are made of titanium or tantalum.

13. The row bar for forming magnetic heads according to claim 1, wherein each of the first and second electrical lapping guide pads is configured to electrically connect with a corresponding electrical lapping guide member configured on a magnetic head for measuring an electrical lapping guide resistance of the magnetic head during the lapping process.

14. The wafer for forming magnetic heads according to claim 7, wherein each of the first and second electrical lapping guide pads is configured to electrically connect with a corresponding electrical lapping guide member configured on a magnetic head for measuring an electrical lapping guide resistance of the magnetic head during the lapping process.

* * * * *